Jan. 2, 1962   P. F. J. LAMAUDIERE   3,015,119
COMBINED WINDSHIELD WIPER AND WASHER SWITCH MECHANISM
Filed Feb. 19, 1959   4 Sheets-Sheet 1

Jan. 2, 1962 P. F. J. LAMAUDIERE 3,015,119
COMBINED WINDSHIELD WIPER AND WASHER SWITCH MECHANISM
Filed Feb. 19, 1959 4 Sheets-Sheet 2
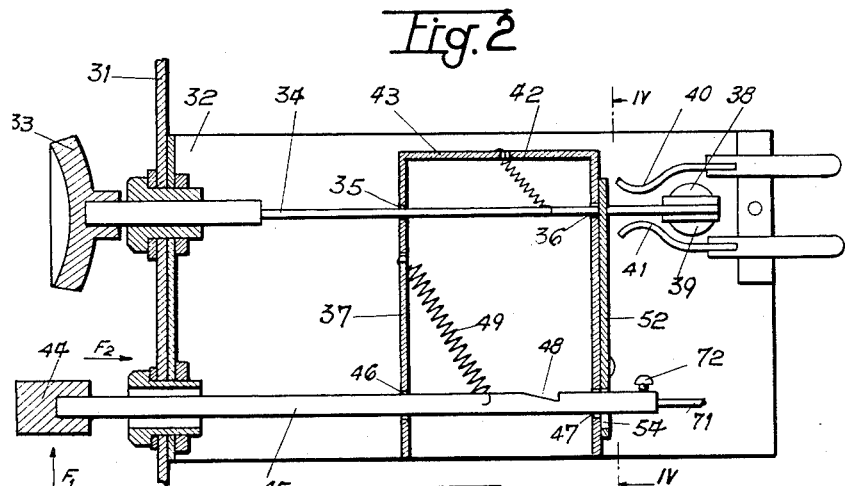
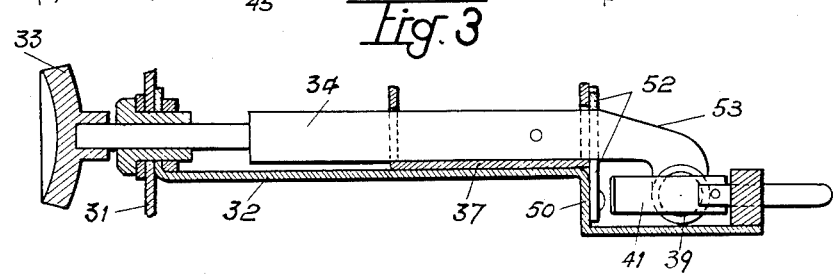
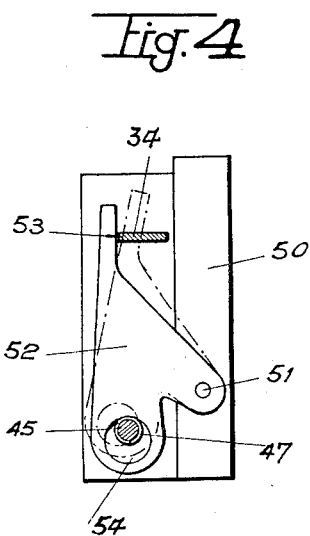
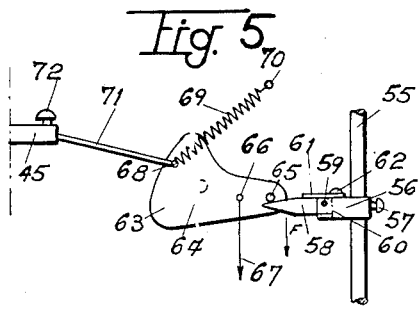

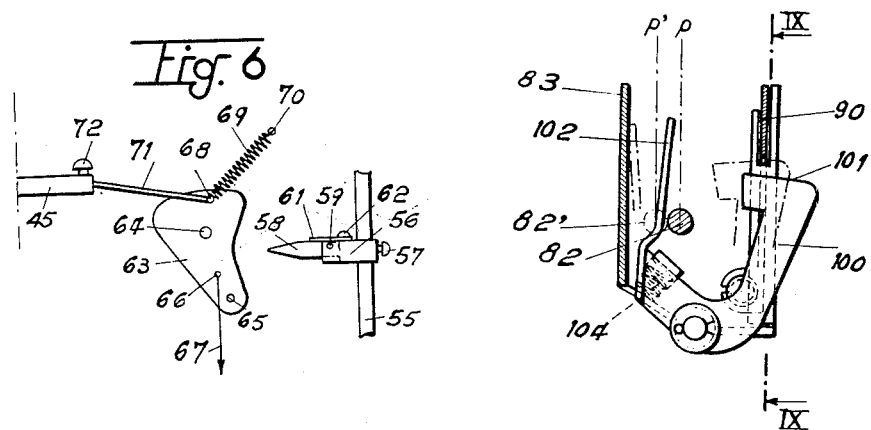
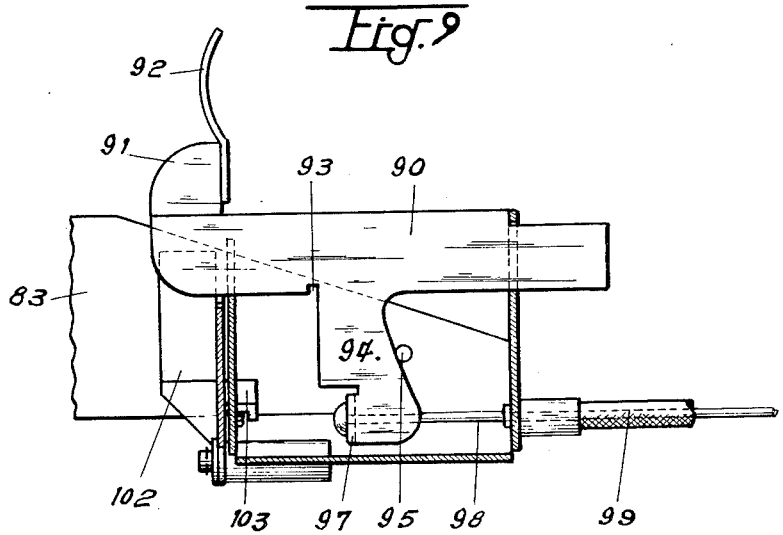

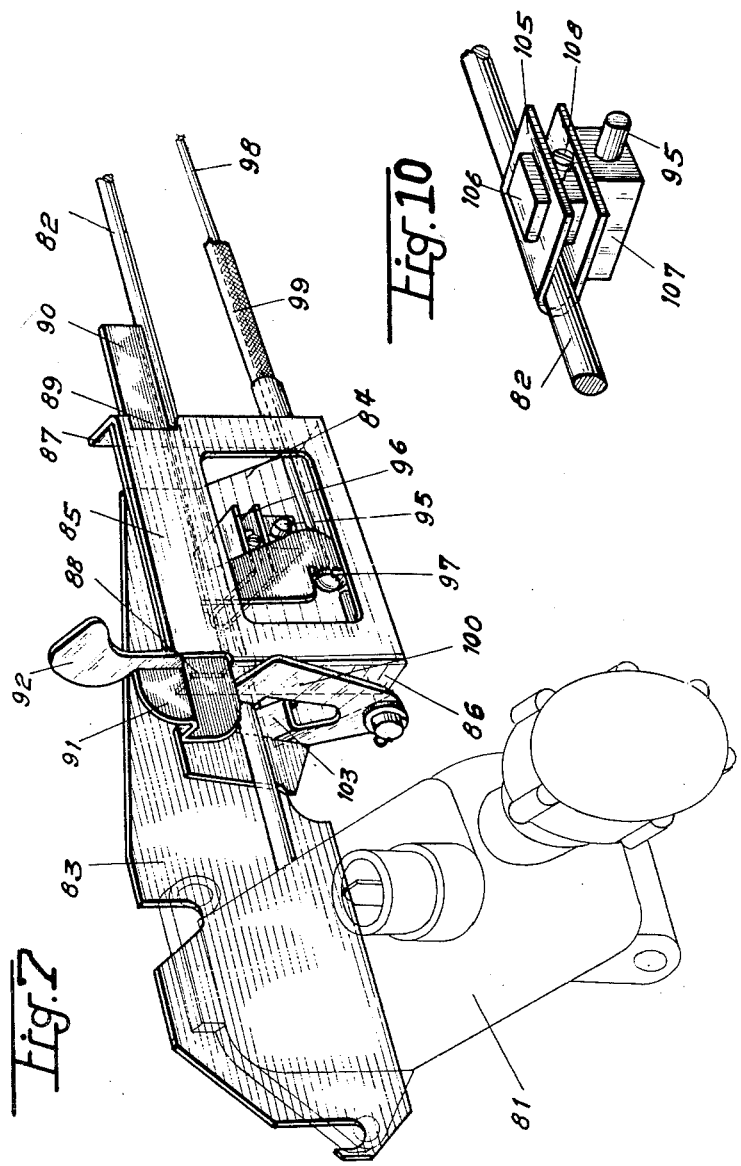

United States Patent Office 3,015,119
Patented Jan. 2, 1962

3,015,119
COMBINED WINDSHIELD WIPER AND WASHER
SWITCH MECHANISM
Paul François Joseph Lamaudiere, 81 Blvd. Suchet,
Paris 16, France
Filed Feb. 19, 1959, Ser. No. 794,353
Claims priority, application France Feb. 25, 1958
4 Claims. (Cl. 15—250.02)

The present invention relates to improvements in windshield washer switch mechanism for vehicles such as automobiles, ships and aircraft. This invention relates more particularly to a control device for a windshield wiper and washer organization.

Existing windshield washers when first set into operation displace the dirt, mud and other greasy substances deposited on the windshield so that an opaque film is often formed on the windshield. The opaque film will often, even if only temporarily, obstruct visibility. This obstruction of the visibility may result in accidents and crashes.

With increasing speeds and more complex operation of the several components in any vehicle the operation of the independent switches used to control the mechanism of the windshield washer and wiper is often required at impropitious times or at the exact time when the operator of the vehicle must keep his attention fully engaged in equally critical operations other than the direct control of the path of the travelling vehicle. Existing windshield washers are also at least partly dependent on the operation of the windshield wiper because they may precede the operation of the wiper or at least the washer may be operated simultaneously with the wiper. Therefore, existing windshield washer and wiper require two successive switching operations which further increase the strain on the operator and further distract him from the other equally difficult tasks requiring his continuous and preferably undivided attention.

It is an aim of the present invention to overcome the above drawbacks and thereby improve safety in the operation of vehicles while simultaneously facilitating said operation.

It is an object of the present invention to provide a control device for a windshield wiper and washer organization whereby the washer mechanism is operated by the wiper motor so that the washer is automatically set into operation whenever the wiper is switched on and regardless of any earlier switching off of the washer mechanism during operation of the wiper.

It is another object of the present invention to provide a control device for a windshield washer and wiper organization automatically operated upon switching on the wiper and including control means enabling switching off and on the washer without interrupting operation of the wiper, said control means being automatically cancelling whenever the wiper is switched off thereby ensuring automatic re-operation of the washer whenever the wiper is restarted.

It is a further object of the present invention to provide a control device for a windshield wiper and washer organization including in combination means for switching on the washer and wiper, control means for independently switching on and off the washer throughout operation of the wiper, and means for synchronizing operation of the washer and wiper so that a liquid jet is delivered on the windshield in timed relation to a wiper blade of the wiper.

Thus in accordance with the present invention the washer is automatically started immediately the wiper is switched on and the washer is driven by the wiper motor although the washer can subsequently be switched on and off without interrupting operation of the wiper.

According to at least one other embodiment of the invention the operation of the windshield washer is more closely synchronized with the movement of the wiper blades included in the wiper by providing the washer with connecting means to be operative to oscillate the wiper blades. In accordance with this embodiment the liquid jet is directed on the windshield during each oscillation or if preferred during every other oscillation of the wiper blades. Under these conditions it is possible to so synchronize the operation of the washer and the wiper blades that the liquid jet is directed on the windshield immediately before the wiper blade sweeps over the windshield and this makes it possible to limit to a minimum the liquid consumption of the washer while substantially avoiding waste of the liquid.

In all embodiments of the invention a common source of power may be used to operate the washer and wiper organization.

The embodiments illustrated in the accompanying drawings will be described by way of example and without limiting the scope of the invention, by way of illustrating the potentialities of the invention.

FIG. 2 is a plan view of another embodiment of a control device constructed in accordance with the present invention.

FIG. 3 is a side view of the device shown in FIG. 2.

FIG. 4 is a section view taken along the line IV—IV of FIG. 2.

FIG. 5 is a fragmentary detail view of the means for synchronizing the movement of the washer to the wiper blades used in combination with the control device shown in FIGS. 2, 3 and 4 and in which the synchronizing means is in its operative position.

FIG. 6 is a view similar to FIG. 5 but showing the synchronizing means in inoperative position.

FIG. 7 is a perspective view of still another embodiment of the control device.

FIGS. 8 and 9 are respectively side and end section views of the device shown in FIG. 7, certain parts being omitted for clarity.

FIG. 10 is a perspective view of one of the elements of the means for synchronizing operation of the washer to the wiper blades adapted to be used with the device shown in FIGS. 7, 8 and 9.

Figure 1:
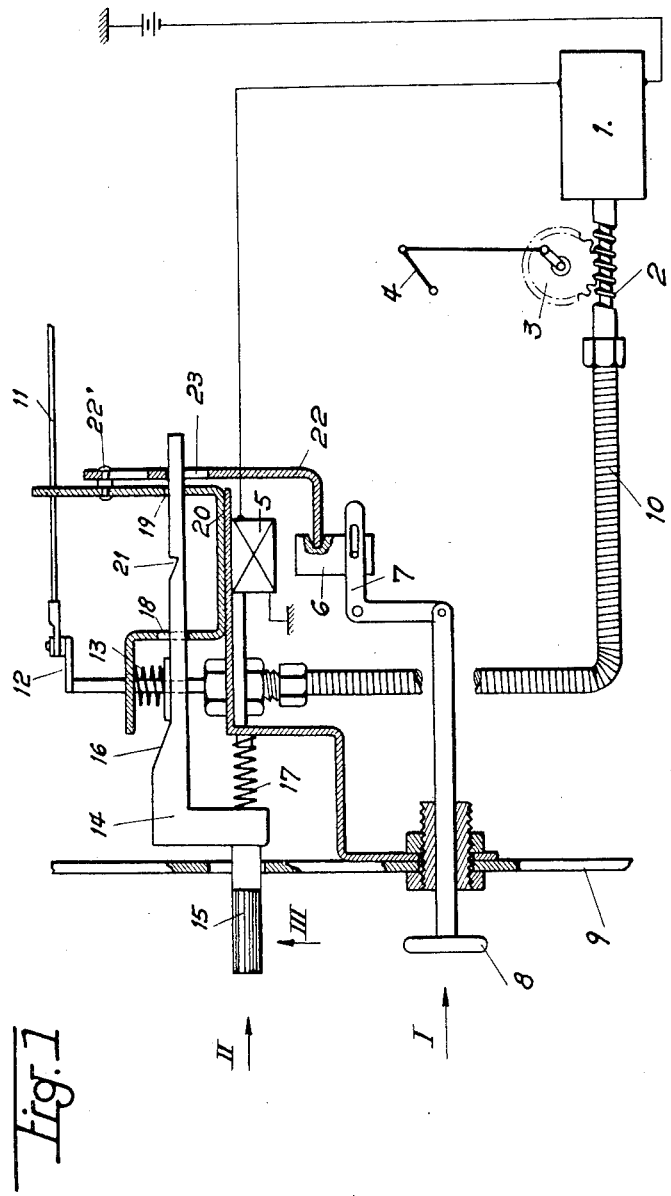
FIG. 1 is a diagrammatic view of a control device for a washer and wiper organization constructed in accordance with the present invention.

Now referring to FIG. 1, the electric motor 1 rotates the worm 2 which is in engagement with pinion 3. The pinion 3 is connected through a linkage mechanism 4 to the wiper blade operating mechanism used to oscillate the blades. The wiper blade operating mechanism is well known and obvious and forms no part of the present invention. Hence the FIG. 1 does not illustrate the wiper blade operating mechanism. The motor 1 is controlled by an interrupting device 5 well known and having one end connected to ground while the other end is connected to a set of breaker points so that when the breaker points are closed the circuit is completed through these points to ground while when the breaker points are opened the circuit is broken. A slider 6 moves the breaker points in the interrupting device 5 in obvious manner. The slider 6 is reciprocated by a rocker arm 7. The rocker arm 7 is angularly moved by a push-pull wiper knob 8 protruding through the instrument panel 9. The interrupting device 5, slider 6, rocker arm 7, and knob 8 constitute starting and stopping means which selectively render motor 1 operative and inoperative.

When the control device for the windshield wiper and washer organization is in the position shown in FIG. 1, the slider 6 is out of engagement with the breaker points in the interrupting device 5 so that the motor 1 is deenergized. The motor 1 is energized by pushing washer wiper knob 8 in the direction of arrow I. The motor 1 also drives the washer mechanism, also not shown since the washer mechanism is well known and obvious and also forms no part of the present invention, through the flexible drive shaft 10 having an inner rotating core, driven by the worm 2 in obvious manner, and which is connectible and disconnectible as explained below with the windshield washer connecting crank arm 12 attached to a rope or lever 11 operatively connected to the washer mechanism. The crank arm 12 oscillates the lever or cable 11 to spray a jet of liquid on the windshield at timed intervals which may be a function of the speed of rotation of the motor and of the length of the linkage mechanism 4 with respect to the length of the crank arm 12. The adjacent ends of the rotating core and of the shaft portion of the crank arm 12 may be provided in well known manner with a male projection adapted to seat in a female seat so that with the ends in abutment the rotating core rotates the crank arm 12.

The abutment of the ends of the rotating core and of the shaft portion of crank arm 12 is controlled by washer knob 15 integral with a sliding member 14 having a cam face 16 sliding against a flange formed on the shaft portion of crank arm 12. The compression spring 17 biases the sliding rod 14 to the position shown in FIG. 1. The compression spring 13 between the auxiliary panel 20 and the flange formed on the shaft portion of the crank arm 12 pushes the flange into abutment with sliding member 14 so that in the position shown in FIG. 1 the ends of the rotating core and of the shaft portion of the crank arm 12 are coupled to rotate together. When the flange rides up the cam face 16 upon inward movement of the sliding member 14 the rotating core and the shaft portion of the crank arm are uncoupled or disconnected to interrupt rotation of the crank arm 12, whereby operation of the washer mechanism is interrupted.

The sliding member 14 is provided with a tooth 21 and with an extremity sliding through a slot 18 and an aperture 19 in the auxiliary panel 20. The slot 18 is larger than aperture 19 to permit a degree of pivotal movement of the sliding rod 14 when the washer knob 15 is pushed in the direction of arrow III. The distance of tooth 21 from the front end of the sliding member 14 is determined to enable engagement of the tooth 21 against the wall of auxiliary panel 20 around aperture 19. When tooth 21 abuts the side of the wall around aperture 19, the sliding member 14 is locked in the position in which the flange abuts the cam face 16 to interrupt rotation of crank arm 12 and thereby render the washer operating mechanism inoperative. Thus, tooth 21 and the wall of auxiliary panel 20 around aperture 19, constitute latching means for locking the sliding member in the position in which the member is uncoupled from the wiper in the manner described below.

The release member 22 is mounted on the slider 6 for movement therewith while the other end of the release member is slotted to surround a stud bearing 22' carried by the auxiliary panel 20 and to restrict the release member for movement in the plane substantially parallel to the plane of movement of slide member 6. The release member 22 is further provided with a slit 23 so that when the release member is in the position shown in FIG. 1 the end wall of the slit abuts the top wall of the extremity of the sliding member 14 to thereby prevent abutment of tooth 21 against the side wall of the aperture 19.

In operation, when the release member 22 is in the position shown in FIG. 1 the sliding member 14 is pushed outwardly or biased by spring 17 to thereby couple the shaft portion of the crank arm 12 with the core of the flexible drive shaft 10. Hence, whenever the operator moves the wiper knob 8 to start the motor 1 and thereby set into motion the wiper mechanism the core is rotated and the core is coupled with the crank arm 12 to set the washer mechanism into operation. Now, assuming the wiper mechanism continues to operate, either the sliding member 14 will remain in the second position shown in FIG. 1 or the washer knob 15 may be pushed in the direction of arrow II to engage the tooth 21 against the side of the aperture 19 (first position of sliding member 14) thereby uncoupling the core from the shaft portion of the crank arm 12 and interrupting the operation of the washer mechanism. The operator passes from the first to the second position by pressing the washer knob 15 in the direction of the arrow III whereby the tooth of the sliding member 14 is disengaged from the side of the aperture 19 thereby rendering the spring 17 operative to return the sliding rod to the position shown in FIG. 1.

It is thus seen that the washer is operative immediately the wiper is operative and that the washer can subsequently be rendered inoperative and reoperative without interrupting operation of the wiper. Also it is clear that immediately the wiper is rendered inoperative by pulling the wiper washer knob 8 in the direction opposite that of the arrow I the end wall of the slit 23 abuts the extremity of the sliding rod 14 to disengage the tooth 21 from the side of the aperture 19, provided the same was so engaged, and enable the spring 17 to return the sliding rod to the position shown in FIG. 1 whereby the flexible core is recoupled with the crank arm 12 to the windshield washer operating mechanism so that immediately wiper washer knob 8 is pushed to start the wiper mechanism the washer mechanism is simultaneously started.

Now referring to FIGS. 2 and 3, the instrument panel 31 is attached to an auxiliary panel 32 on which the control device for the wiper washer organization is mounted. The wiper switch mechanism comprises a push pull wiper washer knob 33 attached to a push rod 34 guided in bearing openings 35, 36 provided in the U-shaped panel portion 37. The push rod 34 carries two contacts 38 and 39 which may be brought into and out of engagement with two spring contact arms 40, 41 in the wiper operating motor circuit. A compression spring 42 is attached in the bight 42 of panel portion 37 so that push rod 34 and wiper washer knob 33 are retained in their rest position. The contacts 38, 39, spring contact arms 40, 41, etc., push rod 34, and knob 33 constitute starting and stopping means which selectively render the motor operative and inoperative.

The control device includes the sliding member 45 integral with washer knob 44 which slides through the two apertures 46, 47 in panel portion 37. The sliding member 45 is provided with a tooth 48 which can abut the end wall of panel portion 37 around aperture 47. The sliding member 45 is spring urged toward the left by a pull back spring 49 or by a combination of equivalent spring mechanisms.

Now referring to FIG. 4, it is seen that the auxiliary panel 32 has a vertical wall 50 carrying a pivot pin 51. The pivot pin 51 supports a release member 52 which is rocked by an inclined or cam face 53, see FIG. 3, formed on the end of push rod 34. In FIG. 4, the full line position of the release member 52 corresponds to the position of the push rod 34 shown in FIGS. 2 and 3 and the broken line position of the release member corresponds to the position of the push rod 34 in which the wiper operating motor circuit is closed, i.e. upon pulling wiper washer knob 33. The release member 52 is provided with an opening 54 having a wall adapted to engage and abut the extremity of the sliding rod 45. When the release member is in the full line position, the wall of opening 54 prevents engagement of tooth 48 with the face of the auxiliary panel around aperture 47 so that spring 49 is operative to hold sliding member 45 in the position shown in FIG. 2. Upon pulling wiper washer knob 33, to start the wiper motor the release member 52 in response to gravity is pivoted to the position shown in broken lines so that the end of the release member 52 always rides on the cam face 53. Hence, if washer knob 44 is then subsequently pushed in the direction of the arrow F2 against the force exerted by the pull back spring 49, the tooth 48 abuts the face of the auxiliary panel around aperture 47 or the wall around the aperture 54 of the release member and the release member is free to rotate until it once again abuts the cam face 53; this is the broken line position in FIG. 4. Thus, tooth 48 and the face of the auxiliary panel around aperture 47 or the wall around aperture 54 of the release member constitute latching means for locking the sliding member in the position in which the member is uncoupled from the wiper in the manner described below. If at any other subsequent time the knob 44 is pushed in the direction of arrow F1 the sliding member 45 will generally pivot at aperture 46 to disengage the tooth 48 from the end face of the auxiliary panel around aperture 47 or from the wall of the aperture 54 of the release member, whereupon pull back spring 49 returns the sliding member 45 to the position shown in FIGS. 1 and 2. Similarly pushing wiper washer knob 33 to break the circuit to the wiper operating mechanism through contacts 38 and 39 returns release member 52 to the full line position shown in FIG. 4 and releases tooth 48 to allow return of sliding member 45 to the position shown in FIGS. 2 and 3.

The sliding movement of the sliding member 45 is transmitted to the synchronising means shown in FIGS. 5 and 6 by the rope or lever 71 which is attached to the end of the sliding rod 45 by a cap screw 72 pressing the end of the rope or lever 71 within an aperture in the end of the sliding rod. The synchronising means includes a rocker lever 63 mounted on a pivot pin 64 suitably attached to any stationary part of the vehicle frame. The rocker lever 63 is spring urged to the position shown in FIG. 6 by the spring 69 attached at one end to any stationary and convenient part of the vehicle frame and at the other end to the projecting member 68. The projecting member 68 is also used as an attachment point for the cable 71. The rocker lever 63 further carries a bearing 66 to which element 67 is attached. The element 67 is connected to the windshield washer mechanism to operate the latter. The rocker lever also carries lug 65. When the sliding member 45 is in the position shown in FIG. 2 the pull back spring 49 which is stronger than the rocker arm spring 69 pivots the rocker lever 63 to the position shown in FIG. 5 wherein lug 65 is in the path of movement of finger 58. When the sliding member is in the position in which the tooth 48 is engaged with the face of the auxiliary panel around aperture 47, or the wall around the aperture 54 of the release member, the rocker arm spring 69 is operative to tension cable 71 and pivot the rocker lever to the position shown in FIG. 6 in which the lug 65 is out of the path of movement of finger 58.

The finger 58 is carried by a sliding block 56 for oscillation about pin 59.

The rear end of finger 58 is cammed to wedge the finger against the end face of the sliding block so that finger 58 cannot be moved below the position shown in FIGS. 5 and 6. However the cam at the rear end of the finger 58 allows upward movement of the finger about pin 59 against spring arm 61 mounted by screw 62 on the sliding block 56. The sliding block 56 is secured for reciprocating movement with a reciprocating arm 55 by a screw member 57 locating the sliding block in any predetermined position on the arm 55. The reciprocating arm 55 is connected to or may itself form part of the windshield wiper mechanism in well known and obvious manner.

Assuming the rocking lever 63 is in the position shown in FIG. 5, when the arm 55 oscillates upwardly the lug 65 lies in the path of movement of the finger 58 and since the finger is then rigid the rocker arm is pivoted counter-clockwise against spring 69 thereby pulling element 67 to operate the windshield washer mechanism until lug 65 becomes disengaged from contact with or escapes finger 58, whereupon spring 69 is immediately operative to return the rocking lever 63 to the position shown in FIG. 5. During the return stroke of the arm 55, the finger 58 will ride over lug 65 by pivoting against spring 61 about pin 59. Hence it is clear that movement of the wiper mechanism transmitted through arm 55 and finger 58 oscillates the rocking lever intermittently to intermittently operate the windshield washer mechanism not shown, through pulling element 67. In the position of the sliding rod 45 shown in FIG. 6, the rocking lever 63 assumes the position in which the lug 65 cannot be engaged by the finger 58 so that the windshield washer remains inoperative throughout.

To recapitulate wiper-washer knob 33 is always operative to start the wiper and washer mechanism simultaneously while washer knob 44 is operative only to start or stop the windshield washer mechanism at will during operation of the wiper mechanism. Whenever wiper washer knob 33 is pushed to the position shown in FIG. 2 to interrupt operation of the wiper mechanism the release member 52 is moved to the full line position so that upon pulling the wiper washer knob again, the washer and wiper mechanisms are simultaneously restarted.

Referring again to the above embodiment, it is obvious to any one skilled in the art that if desired finger 58 may be made integral with sliding block 56 instead of being pivoted as above described so that during each oscillation of arm 55 in either direction the rocking lever 63 correspondingly oscillates the finger 58 to operate the windshield washer mechanism intermittently and twice as often as in the embodiment in which the finger 58 is pivotally mounted under sliding block 56.

Now referring to the embodiment shown in FIGS. 7–10, the starting and stopping means which selectively render the motor mechanism operative and inoperative is generally designated by reference numeral 81 and it is shown in phantom lines and the connecting rod 82 is the drive connection between the motor mechanism and to the wiper blade in well known and obvious manner. Since the starting and stopping means and the motor mechanism 81 are well known, the same are not further described. However, it is noted that the motor mechanism 81 is such that it provides transverse movement of the connecting rod 82 so that it lies in plane P (see FIG. 8) when the motor is operative, i.e. when the connecting rod drives the blade and so that it lies in plane P', shown in dotted lines when the motor is inoperative. The means by which the connecting rod is shifted forms no part of the present invention.

In accordance with the invention, the mechanism 81 is mounted on panel 83 including an inclined wall portion 84. The end of inclined wall portion 84 carries an auxiliary panel 85 parallel to panel 83 and having two side walls 86 and 87. Side walls 86 and 87 are respectively provided with a guiding slit 88 and with a guiding aperture 89 for guiding the sliding member 90. The sliding member 90 is formed with a bent portion 91 carrying the handle or knob 92. The sliding member 90 is provided with a tooth 93 adapted to abut the end wall of guiding slit 88 and with a depending arm 94 having a cammed surface adapted to abut the finger 95 of the sliding block assembly 96, described below. The tooth 93 and the end wall of guiding slit 88 constitute latching means for locking the sliding member in the position in which the washer is uncoupled from the slider in the manner described below. The depending arm 94 is provided with a bearing lug 97 to which is attached the rope or inner core 98 inside the sheath 99 which connects to the washer mechanism, not shown, to operate the latter only when the core 98 is reciprocating.

The side wall 86 carries a bifurcated release member which is mounted for pivotal movement about a cross shaft. The arm 100 of the release member is provided with a stop 101. The arm 102 of the release member extends in a direction substantially parallel to panel 83. A compression spring 104 abuts between inclined wall portion 84 and the cross member 103 provided on the arm 102, to spring urge the release member to the full line position in FIG. 8.

The sliding block assembly 96 more clearly shown in FIG. 10 comprises a U-shaped member 105 traversed by the extension 106 of the block 107 which carries the finger 95 adapted to engage the cammed surface of the depending arm 94. The extension 106 is traversed by a screw element 108 adapted to abut connecting rod 82 to secure the sliding block assembly 96 for reciprocation with the connecting rod 82.

The above described embodiment operates as follows: When the wiper mechanism is inoperative, the connecting rod 82 is in position 82' so that the release member is in the dotted line position shown in FIG. 8. With the release member in the dotted line position the stop 101 lifts the sliding rod 90 to prevent abutment of tooth 93 against the end wall of guiding slit 98 so that sliding rod 90 is thus held by the tension in the inner core 98 in a position in which tooth 93 is well spaced from the end wall of guiding slit 98. Under these conditions, the handle or knob 92 may be manually operated to manually operate the washer mechanism independently of the wiper mechanism.

If the wiper mechanism is then switched on, the connecting rod moves to the position in the P plane (FIG. 8) so that spring 104 moves the release member to the full line position shown in FIG. 8, whereupon the finger 95 is moved into contact with the cammed surface of the depending arm 94 to move the sliding member 90 to the left, see FIG. 9, against the force exerted by the inner core 98 which then becomes operative to return the sliding member 90 to the right during the return stroke of connecting rod 82.

In the event the finger 95 originally abuts the rear surface of the depending arm 94 so that it is not free to engage the cammed surface of the depending arm, the finger 95 reciprocates with the connecting rod 82 until it snaps into engagement with the cammed face and the sliding member 90 will begin reciprocating from such time as the finger 95 abuts the cammed face of the depending arm 94. Thus it is clear that in this embodiment also the switching on of the wiper automatically results in the operation of the washer, since the washer mechanism is arranged to operate only during reciprocation of the core 98.

Now assuming the wiper mechanism has been switched on and it is now desired to interrupt operation of the washer mechanism, the operator moves handle or knob 92 so that tooth 93 engages the end wall of the guiding slit 88 whereby the depending arm 94 of the sliding member 90 is no longer in the path of movement of finger 95 and whereby the sliding member 90 is locked against movement thereby rendering the washer inoperative. The washer mechanism can then be restarted without stopping the operation of the wiper by simply pushing the handle or knob 92 to release the engagement between tooth 93 and the wall of the guide slit 88 so that the tension in the core 98 returns the sliding rod and abuts the same against finger 95 to resume operation of the washer resulting from the reciprocation of the core 98. Alternatively, the washer mechanism can be automatically restarted, if the operation of the wiper has been interrupted, by resuming the operation of the wiper mechanism to once again abut finger 95 on the cammed face of the depending arm 94 of the sliding member 90 in the manner already described. In other words whenever the wiper is stopped the release member is moved to the full line position by spring 104 so that engagement is automatically repeated between the cammed face on the depending arm 94 and the finger 95.

Since equivalent structural elements have been identically identified in the several species of the invention described above, it is clear that all embodiments comprise a control device for a windshield wiper and washer organization comprising a motor for driving the wiper, starting and stopping means for selectively rendering the motor operative and inoperative, and control means for coupling and uncoupling the washer and the wiper; said control means including a sliding member biased from a position in which the washer is uncoupled from the wiper to normally couple the washer and the wiper, latching means for locking the sliding member in the position in which the washer is uncoupled from the wiper so that only the wiper can be driven by the motor, and a release member which is connected to said starting and stopping means and to said latching means for releasing said latching means to thereby unlock said sliding member when said starting and stopping means is operated.

It is to be understood that various changes can be made to the invention described above without departing from the spirit thereof as defined in the appended claims.

What is claimed is:

1. A control device for a windshield wiper and washer organization comprising a motor for driving the wiper, starting and stopping means for selectively rendering the motor operative and inoperative, and control means for coupling and uncoupling the washer and the wiper; said control means including a sliding member biased from a position in which the washer is uncoupled from the wiper to normally couple the washer and the wiper, latching means for locking the sliding member in the position in which the washer is uncoupled from the wiper so that only the wiper can be driven by the motor, and a release member which is connected to said starting and stopping means and to said latching means for releasing said latching means to thereby unlock said sliding member when said starting and stopping means is operated.

2. A control device as claimed in claim 1, wherein said latching means include a tooth formed in the sliding member and a stationary housing provided with a wall having an opening through which said sliding member is engaged, the position in which the washer is uncoupled from the wiper being that in which the tooth abuts the stationary wall whereby the sliding member is locked.

3. A control device as claimed in claim 2, wherein said stationary housing further includes slots through which said sliding member is engaged to permit transverse movement of said sliding member about said opening to disengage the tooth from said aperture whereby the sliding member couples the washer and wiper.

4. A control device as claimed in claim 1 wherein said control means further includes synchronizing means comprising a rocker lever operatively connected to said sliding member and biased by said sliding member from a position in which the rocker lever is operatively connected to the wiper so that the rocker lever is normally disconnected from the wiper.

References Cited in the file of this patent

UNITED STATES PATENTS 2,162,985   West _____ June 20, 1939